US006817629B2

(12) United States Patent
Herberg et al.

(10) Patent No.: US 6,817,629 B2
(45) Date of Patent: Nov. 16, 2004

(54) FOUR-POINT SEAT BELT SYSTEM HAVING OCCUPANT LOCKABLE RETRACTORS

(75) Inventors: Arnold J. Herberg, Davisburg, MI (US); Joseph J. Zwolinski, Warren, MI (US); Alex G. Meduvsky, Romeo, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 122 days.

(21) Appl. No.: 10/282,875

(22) Filed: Oct. 29, 2002

(65) Prior Publication Data

US 2004/0079575 A1 Apr. 29, 2004

(51) Int. Cl.[7] .............................................. B60R 22/48
(52) U.S. Cl. ................... 280/801.1; 280/807; 280/808; 297/484
(58) Field of Search ............................. 280/801.1, 806, 280/807, 808; 297/468, 484, 486, 474, 475

(56) References Cited

U.S. PATENT DOCUMENTS

| | | |
|---|---|---|
| 2,195,334 A | 3/1940 | Lethern |
| 2,403,653 A | 7/1946 | Geohegan et al. |
| 2,899,146 A | 8/1959 | Barecki |
| 3,620,569 A * | 11/1971 | Mathis et al. ................ 297/478 |
| 3,694,029 A | 9/1972 | Noble et al. |
| 3,931,866 A | 1/1976 | Takada |
| 4,090,735 A | 5/1978 | Czernakowski |
| 5,520,263 A | 5/1996 | Suran et al. |
| 5,568,939 A | 10/1996 | Blackburn et al. |
| 5,655,619 A | 8/1997 | Suran et al. |
| 5,676,398 A | 10/1997 | Nurtsch |
| 5,931,401 A | 8/1999 | Rink |
| 6,076,894 A | 6/2000 | Busch |
| 6,139,111 A | 10/2000 | Pywell et al. |
| 6,155,601 A | 12/2000 | Cantor et al. |
| 6,293,588 B1 | 9/2001 | Clune |
| 6,305,713 B1 * | 10/2001 | Pywell et al. ............ 280/801.1 |
| 6,309,024 B1 * | 10/2001 | Busch ....................... 297/484 |
| 6,375,270 B1 * | 4/2002 | Sullivan et al. ............ 297/484 |
| 6,729,693 B2 * | 5/2004 | Soderstrom et al. ........ 297/484 |
| 2002/0089164 A1 * | 7/2002 | Rouhana et al. ......... 280/801.1 |

FOREIGN PATENT DOCUMENTS

| | | |
|---|---|---|
| DE | 7626542 | 12/1977 |
| DE | 3838789 A1 | 5/1990 |
| DE | 19505448 A1 | 8/1996 |
| EP | 0383473 A2 | 8/1990 |

* cited by examiner

Primary Examiner—Paul N. Dickson
Assistant Examiner—Toan C To
(74) Attorney, Agent, or Firm—Tarolli, Sundheim, Covell & Tummino L.L.P.

(57) ABSTRACT

A vehicle occupant protection system (30) comprises first and second lap belts (32 and 34) and first and second shoulder belts (36 and 38). A buckle assembly (90) is provided for interconnecting the first and second shoulder belts (36 and 38) and the first and second lap belts (32 and 34). At least one lap belt retractor (50) is operatively connected to the first and second lap belts (32 and 34) and is electrically actuatable, in response to receiving a first electrical locking signal, for locking the at least one lap belt retractor (50) to prevent withdrawal of the first and second lap belts (32 and 34). An occupant actuatable mechanism (160) is operatively connected to the at least one lap belt retractor (50) and is responsive to actuation by the vehicle occupant for providing the first electrical locking signal to the at least one lap belt retractor (50).

20 Claims, 6 Drawing Sheets

200
FOUR-POINT SEAT BELT SYSTEM HAVING OCCUPANT LOCKABLE RETRACTORS

TECHNICAL FIELD

The present invention relates to a vehicle occupant protection system. More particularly, the present invention relates to a four-point seat belt system having retractors that are lockable by the vehicle occupant.

BACKGROUND OF THE INVENTION

A known seat belt system includes two shoulder belts and two lap belts. Each shoulder belt extends from an associated shoulder belt retractor, which is fixed relative to an upper portion of a vehicle seat, downward to a buckle assembly. One lap belt extends upwardly from an anchor on the right side of the vehicle seat and through the buckle assembly. The lap belt then extends downwardly from the buckle assembly to a lap belt retractor. The other lap belt extends upwardly from an anchor on the left side of the vehicle seat and through the buckle assembly. The other lap belt then extends downwardly from the buckle assembly to the lap belt retractor.

The lap belt retractor includes a rewind spring for removing slack from the lap belts and a locking mechanism that prevents further withdrawal of the lap belts in response to a vehicle crash sensor detecting a crash event condition. Similarly, the shoulder belt retractors include rewind springs for removing slack from the shoulder belts and locking mechanisms that prevent further withdrawal of the shoulder belts in response to the vehicle crash sensor detecting a crash event condition. At times other than during a detected crash event condition, the lap belt retractor and the shoulder belt retractors enable the lap belts and the shoulder belts to be withdrawn.

During certain events, a vehicle occupant may desire to lock or cinch the lap belts and shoulder belts. For example, a driver of a four-wheel drive vehicle may occasionally desire to drive the vehicle off-road. During such occasions, the driver may want to lock the belts of the seat belt system to prevent withdrawal of the respective belts. As a result of preventing withdrawal of the respective belts, the driver is more securely retained in position on the vehicle seat.

SUMMARY OF THE INVENTION

The present invention relates to a vehicle occupant protection system. The vehicle occupant protection system comprises first and second lap belts. The first lap belt is for extending across a first lap portion of the vehicle occupant and the second lap belt is for extending across a second lap portion of the vehicle occupant. At least one lap belt retractor is operatively connected to the first and second lap belts and is electrically actuatable, in response to receiving a first electrical locking signal, for locking the at least one lap belt retractor to prevent withdrawal of the first and second lap belts. The vehicle occupant protection system also comprises first and second shoulder belts. The first shoulder belt is for extending over a first shoulder of the vehicle occupant and the second shoulder belt is for extending over a second shoulder of the vehicle occupant. A buckle assembly is provided for interconnecting the first and second shoulder belts and the first and second lap belts. An occupant actuatable mechanism is operatively connected to the at least one lap belt retractor and is responsive to actuation by the vehicle occupant for providing the first electrical locking signal to the at least one lap belt retractor.

According to another aspect, the present invention relates to a vehicle occupant protection system comprising first and second lap belts. The first lap belt is for extending across a first lap portion of the vehicle occupant and the second lap belt is for extending across a second lap portion of the vehicle occupant. At least one lap belt retractor is operatively connected to the first and second lap belts and is electrically actuatable, in response to receiving a first electrical locking signal, for locking the at least one lap belt retractor to prevent withdrawal of the first and second lap belts. The vehicle occupant protection system also comprises first and second shoulder belts. The first shoulder belt is for extending over a first shoulder of the vehicle occupant and the second shoulder belt is for extending over a second shoulder of the vehicle occupant. A buckle assembly interconnects the first and second shoulder belts and the first and second lap belts. An occupant actuatable switch has an off position and a first on position. The occupant actuatable switch, when in the first on position, provides the first electrical locking signal to the at least one lap belt retractor. The vehicle occupant protection system further comprises a crash sensor for detecting a crash event condition and for providing the first electrical locking signal to the at least one lap belt retractor when the occupant actuatable switch is in the off position and a crash event condition is detected.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
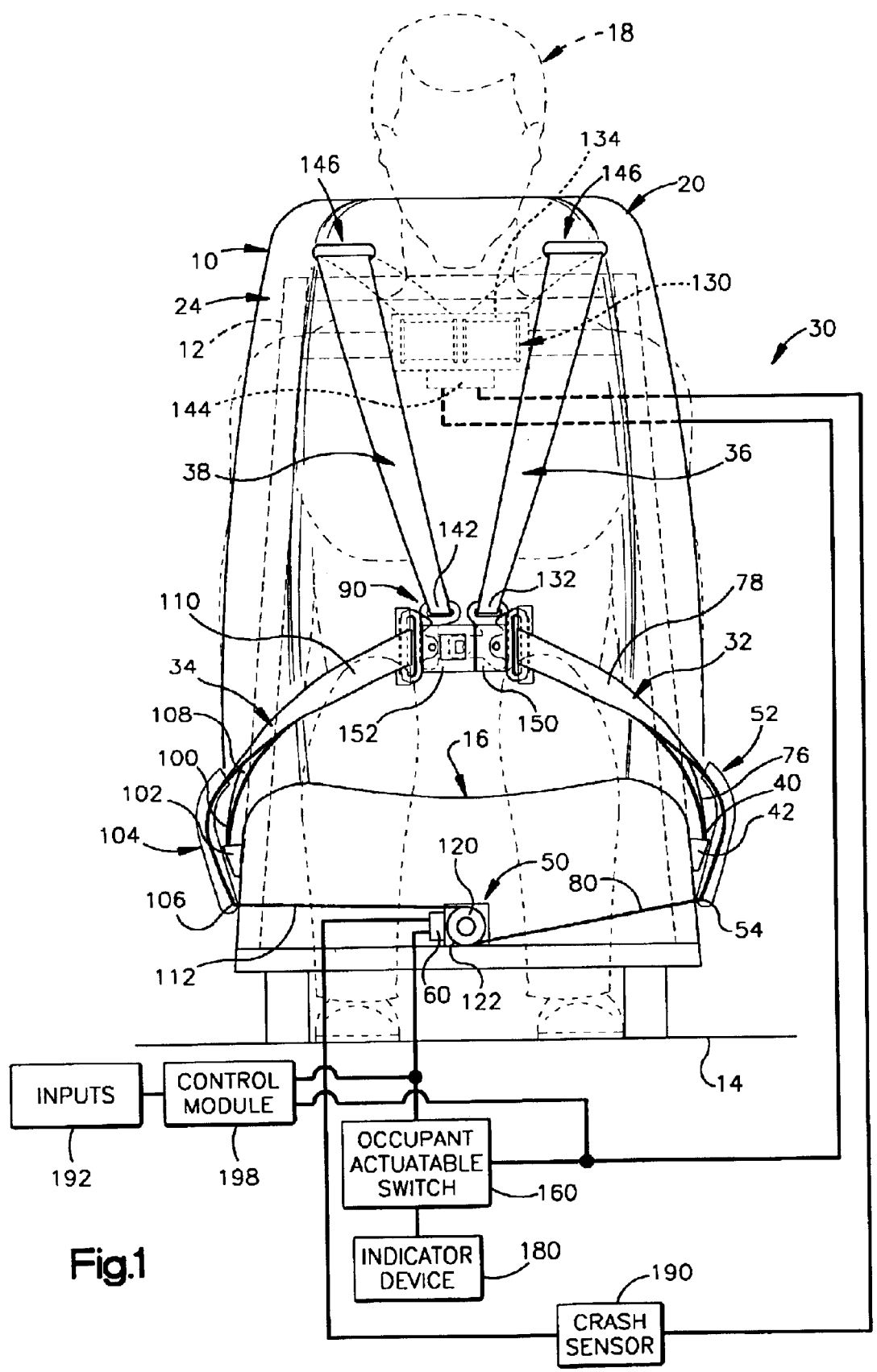
FIG. 1 is a schematic illustration of a vehicle occupant protection system constructed in accordance with the present invention.

A vehicle seat 10 is shown in FIG. 1. The seat 10 includes a frame 12 that is secured to the vehicle 14 in a known manner. The seat 10 also includes a cushion portion 16 upon which a vehicle occupant 18 sits and a backrest portion 20 that extends upwardly from the cushion portion. An upper portion 24 of the backrest portion 20 of the seat 10 is located adjacent the shoulders of the seated occupant 18.

FIG. 1 also illustrates a vehicle occupant protection system 30 constructed in accordance with the present invention. The vehicle occupant protection system 30 illustrated in FIG. 1 may be referred to as a "four-point seat belt system." The four-point seat belt system 30 includes lap belts 32 and 34 and shoulder belts 36 and 38. Each lap belt 32 and 34 extends over a portion of the lap of the occupant 18 and each shoulder belt 36 and 38 extends over an associated shoulder of the occupant. The vehicle occupant protection system 30 may include any conventional four-point seat belt system. An exemplary four-point seat belt system 30 is described with reference to FIG. 1.

Lap belt 32 has an end 40 that is connected to the frame 12 on the left side of the seat 10. An anchor 42 fixes end 40 to the frame 12. The anchor 42 may be attached to the frame 12 of the seat 10 in any suitable manner. The end 40 of the lap belt 32 is pivotal about the anchor 42 and relative to the seat 10. An opposite end (not shown) of lap belt 32 is connected to a lap belt retractor 50. The lap belt retractor 50 is mounted to the frame 12 of the seat 10 in a location below the cushion portion 16 of the seat.

FIG. 1 illustrates a tubular lap belt guide 52 that is attached to the frame 12 on the left side of the seat 10. The tubular belt guide 52 provides a passage for lap belt 32 from a position adjacent a top surface of the cushion portion 16 of the seat to a position below the cushion portion of the seat. Preferably, the tubular belt guide 52 includes a D-ring (not shown) for supporting the lap belt during a turn of lap belt 32, indicated at 54. Alternative structures for guiding the lap belt 32 to the lap belt retractor 50 may be used in place of the tubular belt guide 52.

A first length of lap belt 32, shown partially at 76, extends from end 40 and upward to a buckle assembly 90. A second length 78 of lap belt 32 extends downwardly from the buckle assembly 90 into the tubular belt guide 52 and to the turn 54. The first length 76 is oriented at an acute angle relative to the second length 78. As shown in FIG. 1, the direction of lap belt 32 changes at the turn 54. A third length 80 of lap belt 32 extends from the turn 54 to the lap belt retractor 50.

The sum of the first, second, and third lengths 76, 78, and 80, respectively, of lap belt 32 equals the withdrawn length of lap belt 32. Pulling upwardly on the second length 78 to withdraw lap belt 32 from the lap belt retractor 50 varies the withdrawn length of lap belt 32. Thus, the withdrawn length of lap belt 32 is adjustable.

Lap belt 34 is similar in construction to lap belt 32. Lap belt 34 has an end 100 that is connected to the frame 12 on the right side of the seat 10. An anchor 102 fixes end 100 to the frame 12. The anchor 102 may be attached to the frame 12 of the seat in any suitable manner. The end 100 of the lap belt 34 is pivotal about the anchor 102 and relative to the seat 10. An opposite end (not shown) of lap belt 34 is connected to the lap belt retractor 50.

A tubular lap belt guide 104 is attached to the right side of the seat 10. The tubular lap belt guide 104 is similar to the lap belt guide 52. Preferably, the tubular belt guide 104 includes a D-ring (not shown) for supporting the lap belt during a turn of lap belt 34, indicated at 106. Alternative structures for guiding the lap belt 34 to the lap belt retractor 50 may be used in place of the tubular belt guide 104.

A first length of lap belt 34, shown partially at 108, extends from end 100 and upward to the buckle assembly 90. A second length 110 of lap belt 34 extends downwardly from the buckle assembly 90 into the tubular belt guide 104 and to the turn 106. The first length 108 is oriented at an acute angle relative to the second length 110. A third length 112 of lap belt 34 extends from the turn 106 to the lap belt retractor 50.

The sum of the first, second, and third lengths 108, 110, and 112 of lap belt 34 equals the withdrawn length of lap belt 34. Pulling upwardly on the second length 110 to withdraw lap belt 34 from the lap belt retractor 50 varies the withdrawn length of lap belt 34.

The lap belt retractor 50 illustrated in FIG. 1 is a dual payout retractor and includes a single spool 120 for receiving both lap belts 32 and 34. As shown in FIG. 1, lap belt 32 extends from a lower side of the spool 120 and toward guide 52. Lap belt 34 extends from an upper side of the spool 120 and toward guide 104. Thus, rotation of the spool 120 in a clockwise direction, as viewed in FIG. 1, results in the retraction of both lap belts 32 and 34. Rotation of the spool 120 in a counterclockwise direction, as viewed in FIG. 1, results in the withdrawal of both lap belts 32 and 34.

The lap belt retractor 50 includes a retraction mechanism (not shown) that is operatively connected to the spool 120 for driving the spool in a retraction direction, clockwise as shown in FIG. 1. For example, the retraction mechanism may include a rewind spring (not shown) that is uncoiled or stretched during rotation of the spool 120 in the withdrawal direction to allow manual withdrawal of the lap belts 32 and 34 from the lap belt retractor 50. After manual withdrawal of the lap belts 32 and 34, the rewind spring rotates the spool 120 in the retraction direction to remove any slack from the lap belts 32 and 34.

The lap belt retractor 50 also includes a known electrically actuatable locking mechanism, shown schematically in FIG. 1 at 60. One known electrically actuatable locking mechanism that may be used in the lap belt retractor 50 is disclosed in U.S. Pat. No. 4,895,317, entitled "ELECTRICALLY ACTUATABLE LOCKING MECHANISM FOR A SEAT BELT RETRACTOR" and which is assigned to the assignee of the present invention.

The locking mechanism 60, in response to receiving an electrical locking signal, is actuated to a locked condition in which the spool 120 of lap belt retractor 50 is prevented from rotating in the withdrawal direction. While the locking mechanism 60 is in the locked condition, the spool 120 may still be rotated in a retraction direction.

The lap belt retractor 50 also includes an in-use switch 62. The in-use switch 62 is a known device that indicates when a predetermined length of webbing is withdrawn from the lap belt retractor 50. An exemplary in-use switch 62 is disclosed in U.S. Pat. No. 5,931,401, which is assigned to TRW Occupant Restraint Systems GmbH.

Each of the shoulder belts 36 and 38 of the four-point seat belt system 30 extends outwardly from the upper portion 24 of the backrest portion 20 of the seat 10. Shoulder belt 36 is associated with a left shoulder of the occupant 18, and shoulder belt 38 is associated with the right shoulder of the occupant.

Shoulder belt 36 has a first end (not shown) that is connected with shoulder belt retractor 130 and a second end 132 that is connected to the buckle assembly 90. Shoulder belt retractor 130 is mounted on the frame 12 of the backrest portion 20 of the seat 10. When the occupant 18 is seated in the seat 10, as shown in FIG. 1, shoulder belt 36 extends over the left shoulder of the occupant 18. The withdrawn length of shoulder belt 36 is adjustable.

Shoulder belt 38 has a first end (not shown) that is connected with shoulder belt retractor 130 and a second end 142 that is connected to the buckle assembly 90. When an occupant 18 is seated in the seat 10, as shown in FIG. 1, shoulder belt 38 extends over the right shoulder of the occupant 18. The withdrawn length of shoulder belt 38 also is adjustable.

The shoulder belt retractor 130 illustrated in FIG. 1 is a dual payout retractor and includes a single spool 134 with two belt winding surfaces for receiving the shoulder belts 36 and 38. The first end of shoulder belt 36 is secured to the spool 134 of shoulder belt retractor 130 and a portion of shoulder belt 36 is wound around the spool. Likewise, the first end of shoulder belt 38 is secured to the spool 134 of shoulder belt retractor 130 and a portion of shoulder belt 38 is wound around the spool. Shoulder belts 36 and 38 are wound around the spool 134 in the same direction. Therefore, rotation of the spool 134 in a retraction direction shortens the withdrawn lengths of shoulder belts 36 and 38 and rotation of the spool in the withdrawal direction lengthens the withdrawn lengths of shoulder belts 36 and 38.

The shoulder belt retractor 130 includes a retraction mechanism (not shown) that is operatively connected to the spool 134 for driving the spool in a retraction direction. For example, the retraction mechanism may include a rewind spring (not shown) that is uncoiled or stretched during rotation of the spool 134 in the withdrawal direction to allow manual withdrawal of the shoulder belts 36 and 38 from the shoulder belt retractor 130. After manual withdrawal of the shoulder belts 36 and 38, the rewind spring rotates the spool 134 in the retraction direction to remove any slack from the shoulder belts 36 and 38.

The shoulder belt retractor 130 also includes a known electrically actuatable locking mechanism, shown schematically in FIG. 1 at 144. The locking mechanism 144 of shoulder belt retractor 130 is preferably of the same construction as the locking mechanism 60 used for lap belt retractor 50.

The locking mechanism 144, in response to receiving an electrical locking signal, is actuated to a locked condition in which the spool 134 of shoulder belt retractor 130 is prevented from rotating in the withdrawal direction. While the locking mechanism 144 is in the locked condition, the spool 134 may still be rotated in a retraction direction.

A guide 146 is associated with each shoulder belt 36 and 38 for guiding the shoulder belt from shoulder belt retractor 130 and out of the upper portion 24 of the backrest portion 20 of the seat 10. An elongated opening to each guide 146 is illustrated in FIG. 1.

The buckle assembly 90 of the four-point seat belt system 30 includes first and second buckle members 150 and 152, respectively. The first buckle member 150 includes a lap belt connecting portion and a shoulder belt connecting portion, both of which are slotted belt guides. A tongue assembly extends outwardly of the first buckle member 150. Lap belt 32 passes through the lap belt connecting portion of the first buckle member 150. The first buckle member 150 is slidable on lap belt 32 to enable the position of the first buckle member relative to lap belt 32 to be adjusted. End 132 of shoulder belt 36 is fixed to the shoulder belt connecting portion of the first buckle member 150.

The second buckle member 152 also includes a lap belt connecting portion and a shoulder belt connecting portion, both of which are slotted belt guides. A latch mechanism also forms a portion of the second buckle member 152. Lap belt 34 passes through the lap belt connecting portion of the second buckle member 152. The second buckle member 152 is slidable on lap belt 34 to enable the position of the second buckle member 152 relative to lap belt 34 to be adjusted. End 142 of shoulder belt 38 is fixed to the shoulder belt connecting portion of the second buckle member 152.

The latch mechanism of the second buckle member 152 receives the tongue assembly of the first buckle member 150 and latches the tongue assembly to connect the first and second buckle members of the buckle assembly 90.

The four-point seat belt system 30 also includes an occupant actuatable mechanism or switch 160. The switch 160 is operatively connected to the lap belt retractor 50 and to the shoulder belt retractor 130.

Figure 2:
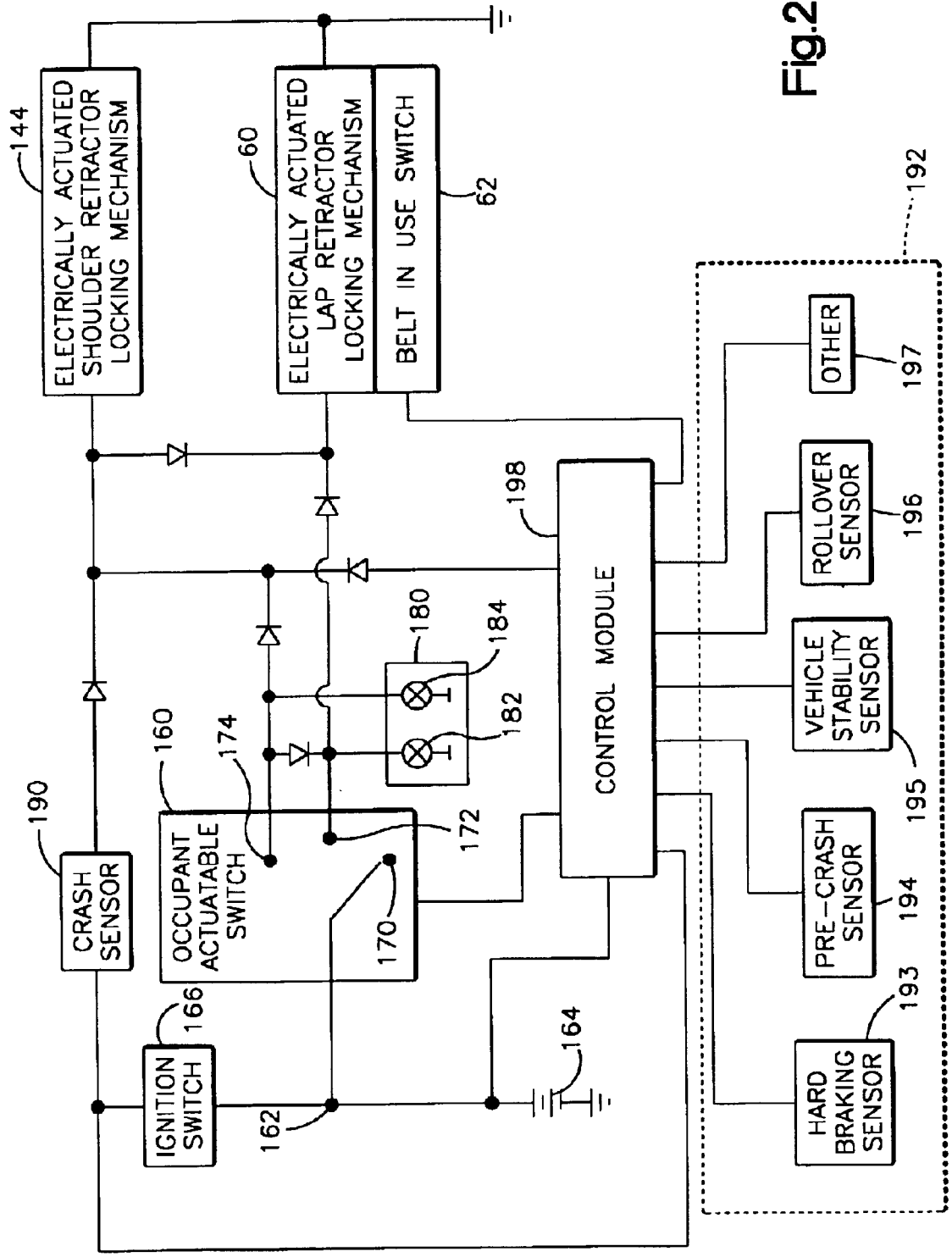
FIG. 2 is a schematic circuit diagram of the vehicle occupant protection system of FIG. 1.

As shown in FIG. 2, a first side 162 of switch 160 receives power from a power source 164, preferably the vehicle battery. The vehicle ignition switch 166 also receives power from the power source 166. The switch 160 and the vehicle ignition 166 are wired in parallel to one another relative to the power source 164.

As illustrated in FIG. 2, the switch 160 has three positions, an off position 170, a first on position 172 or lap position, and a second on position 174 or lap and shoulder position. The off position 170 is an open condition for the switch 160. The first on position 172 includes an electric contact that is electrically connected to the lap belt retractor 50. The second on position 174 includes an electric contact that is electrically connected to the lap belt retractor 50 and to the shoulder belt retractor 130.

The switch 160 is open when in the off position 170 and, thus, no power is transferred via the switch. When the switch 160 is in the first on position 172, electrical power is transferred to the lap belt retractor 50. FIG. 2 illustrates a plurality of diodes that prevent electrical power from being transferred to the shoulder belt retractor 130 when the switch 160 is in the first on position 172. The electric power sent to the lap belt retractor 50, as a result of switch 160 being in the first on position 172, is the electrical locking signal for lap belt retractor 50. Thus, in response to the switch 160 being in the first on position 172, the locking mechanism 60 of the lap belt retractor 50 is actuated into the locked condition and prevents the spool 120 of the lap belt retractor from rotating in the withdrawal direction. As a result, the lap belts 32 and 34 are locked or cinched in position about the occupant.

When the switch 160 is in the second on position 174, electrical power is transferred to the lap belt retractor 50 and is also transferred to the shoulder belt retractor 130. The electric power sent to the lap belt retractor 50, as a result of switch 160 being in the second on position 174, is the electrical locking signal for lap belt retractor 50. The electric power sent to the shoulder belt retractor 130, as a result of switch 160 being in the second on position 174, is the electrical locking signal for shoulder belt retractor 130. Thus, in response to the switch 160 being in the second on position 174, the locking mechanism 60 of the lap belt retractor 50 is actuated into the locked condition and prevents the spool 120 of the lap belt retractor from rotating in the withdrawal direction. As a result, the lap belts 32 and 34 are locked or cinched in position about the occupant. Additionally, the locking mechanism 144 of the shoulder belt retractor 130 is actuated into the locked condition and prevents the spool 134 of the shoulder belt retractor from rotating in the withdrawal direction. As a result, the shoulder belts 36 and 38 are locked or cinched in position about the occupant 18.

The four-point seat belt system 30 also includes an indicator device 180. The indicator device 180 is electrically connected to the electrical contact of the first on position 172 and the electrical contact of the second on position 174. In response to the switch 160 being positioned in the first on position 172, the indicator device 180 provides a first occupant perceptible signal. In response to the switch 160 being positioned in the second on position 174, the indicator device 180 provides a second occupant perceptible signal. Preferably, the indicator device 180 includes two light emitting diodes (LED's) 182 and 184 (FIG. 2). In response to the switch 160 being positioned in the first on position 172, a first LED 182 is energized to provide a visual indication that the locking mechanism 60 of the lap belt retractor 50 is in the locked condition, i.e., the spool 120 of the lap belt retractor 50 is prevented from being rotated in the withdrawal direction. In response to the switch 160 being positioned in the second on position 174, the first LED 182 and a second LED 184 are energized. Energization of the first LED 182 provides a visual indication that the locking mechanism 60 of the lap belt retractor 50 is in the locked condition. Energization of the second LED 184 provides a visual indication that the locking mechanism 144 of the shoulder belt retractor 130 is in the locked condition.

The four-point seat belt system 30 also includes a crash sensor 190 for detecting a vehicle crash event condition. The crash sensor 190 is wired in series with the vehicle ignition switch 166 so that the crash sensor 190 receives power from the power source 164 when the vehicle ignition is in an on or run position and is powered off when the vehicle ignition 166 is in an off position.

As illustrated in FIGS. 1 and 2, the crash sensor 190 is operatively connected to lap belt retractor 50 and to shoulder belt retractor 130. The crash sensor 190, in response to detecting a crash event condition, outputs electrical locking signals to the lap belt retractor 50 and the shoulder belt retractor 130. The locking mechanism 60 of the lap belt retractor 50 is actuated into the locked condition in response to the electrical locking signal from the crash sensor 190. Similarly, the locking mechanism 144 of the shoulder belt retractor 130 is actuated into the locked condition in response to the electrical locking signal from the crash sensor 190. The electrical locking signals from the crash sensor 190 are provided in parallel to any electrical locking signals resulting from the positioning of switch 160. Thus, in the event of a crash event condition, both the lap belt retractor 50 and the shoulder belt retractor 130 are placed in a locked condition regardless of the position of switch 160. Advantageously, the crash sensor 190, in response to sensing a crash event condition, simultaneously actuates the locking mechanism 60 of the lap belt retractor 50 and the locking mechanism 144 of the shoulder belt retractor 130.

In addition to the crash sensor 190, the four-point seat belt system 30 also includes other vehicle condition inputs, indicated generally at 192. The other vehicle condition inputs 192 may include a hard braking sensor 193, a pre-crash sensor 194, a vehicle stability sensor 195 for sensing hard cornering or collision avoidance maneuvering of the vehicle, a rollover sensor 196, and any other vehicle condition sensors 197. Each of the hard braking sensor 193, the pre-crash sensor 194, the vehicle stability sensor 195, the rollover sensor 196, and the other vehicle condition sensors 197 output condition signals in response to monitoring an associated vehicle condition.

The four-point seat belt system 30 also includes a control module 198. The control module 198 preferably includes a microcomputer. The control module 198 receives power from the power source 164. The control module 198 is operatively connected to and receives signals from the ignition switch 166, the lap belt in-use switch 62, and the other vehicle condition inputs 192. The signal from the vehicle ignition switch 166 indicates to the control module 198 whether the vehicle ignition switch 166 is in an off position or is in an on or run position. The signal from the lap belt in-use switch 62 indicates whether the predetermined length of lap belts 32 and 34 have been withdrawn from the lap belt retractor 50. The signals from the other vehicle condition inputs 192 indicate whether an associated vehicle condition is present, such as hard braking, rollover, etc.

The control module 198 is also operatively connected to the locking mechanism 60 of the lap belt retractor 50 and the locking mechanism 144 of the shoulder belt retractor 130. The control module 198, in response to signals from the other vehicle condition inputs 192, may output an actuation signal to the locking mechanisms 60 and 144 for locking the lap belt retractor 50 and the shoulder belt retractor 130. For example, if in response to a signal from the rollover sensor 196, the control module 198 determines that it is desirable to lock the lap belt and shoulder belt retractors 50 and 130, the control module 198 will output an actuation signal to lock the lap belt and shoulder belt retractors 50 and 130.

The control module 198, in response to the at least one signal form the ignition switch 166 and the lap belt in-use switch 62, is operable to output a reset signal to the switch 160 for actuating the switch 160 into the off position 170. For example, the control module 198 may be programmed to reset the switch 160 to the off position when the ignition switch 166 is in the off position 170 and the lap belt in-use switch 62 indicates that the predetermined length of webbing is not withdrawn, i.e., lap belts 32 and 34 are not in use.

The vehicle occupant protection system 30 of the present invention allows the occupant 18 selectively to lock or cinch the lap belts 32 and 34 and the shoulder belts 36 and 38. For example, the vehicle occupant 18 may choose to place the switch 160 in the first on position 172. As a result of the switch 160 being in the first on position 172, lap belts 32 and 34 become locked against further withdrawal. Thus, the lap of the occupant 18 is constrained from moving in the vehicle seat 10. However, since the shoulder belts 36 and 38 are not locked when the switch 160 is in the first on position 172, the occupant 18 may still lean forward away from the back portion 20 of the seat 10. This allows the vehicle occupant 18 mobility for adjusting temperature controls, etc., while still securing the lap of the occupant relative to the seat 10. In another example, the vehicle occupant 18 may choose to place the switch 160 in the second on position 174. As a result of the switch 160 being in the second on position 174, lap belts 32 and 34 and the shoulder belts 36 and 38 become locked against further withdrawal. Thus, both the lap and the torso of the occupant 18 are constrained from moving away from the vehicle seat 10.

Figure 3:
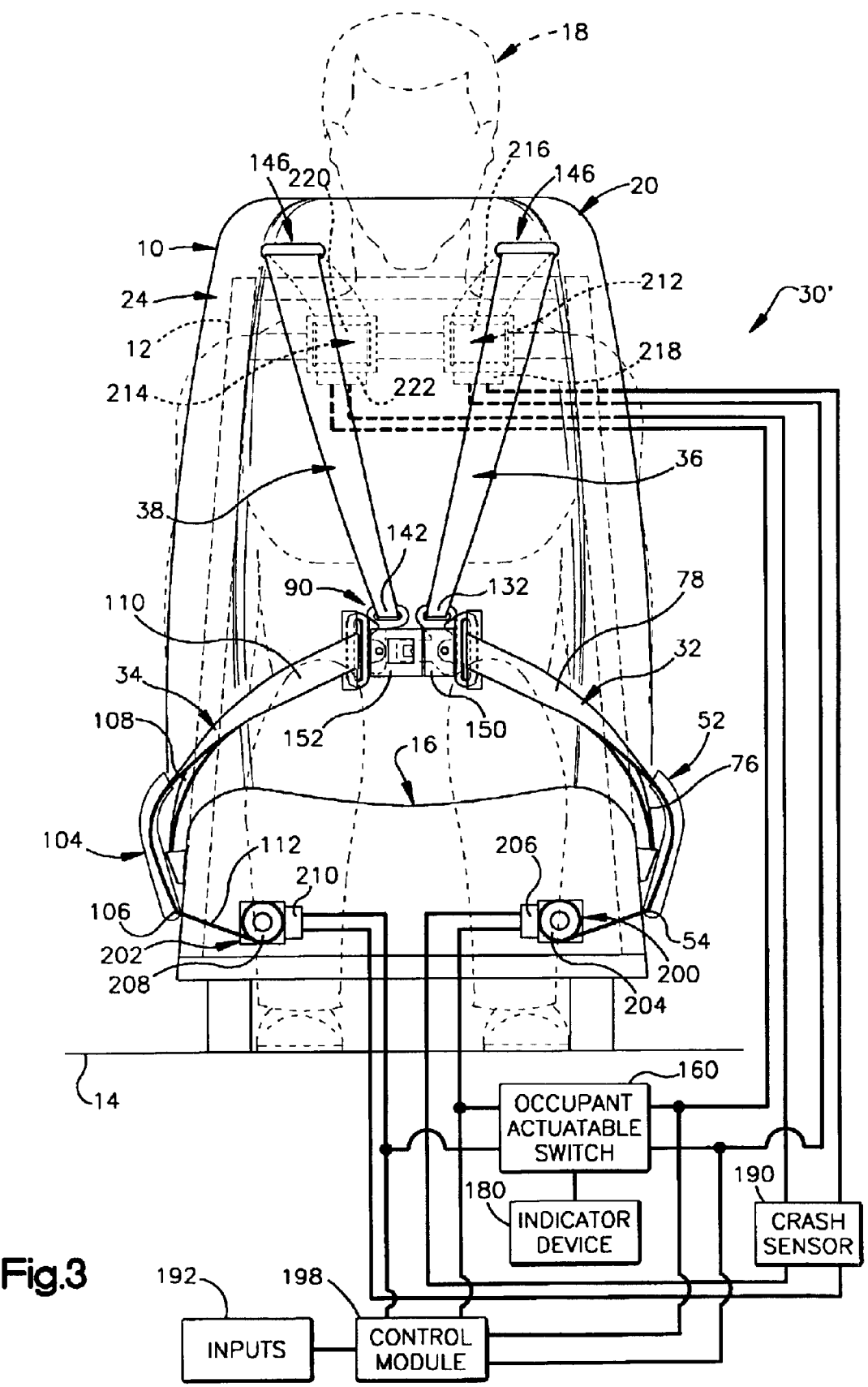
FIG. 3 is a schematic illustration of a vehicle occupant protection system constructed in accordance with a second embodiment of the present invention.
Figure 4:
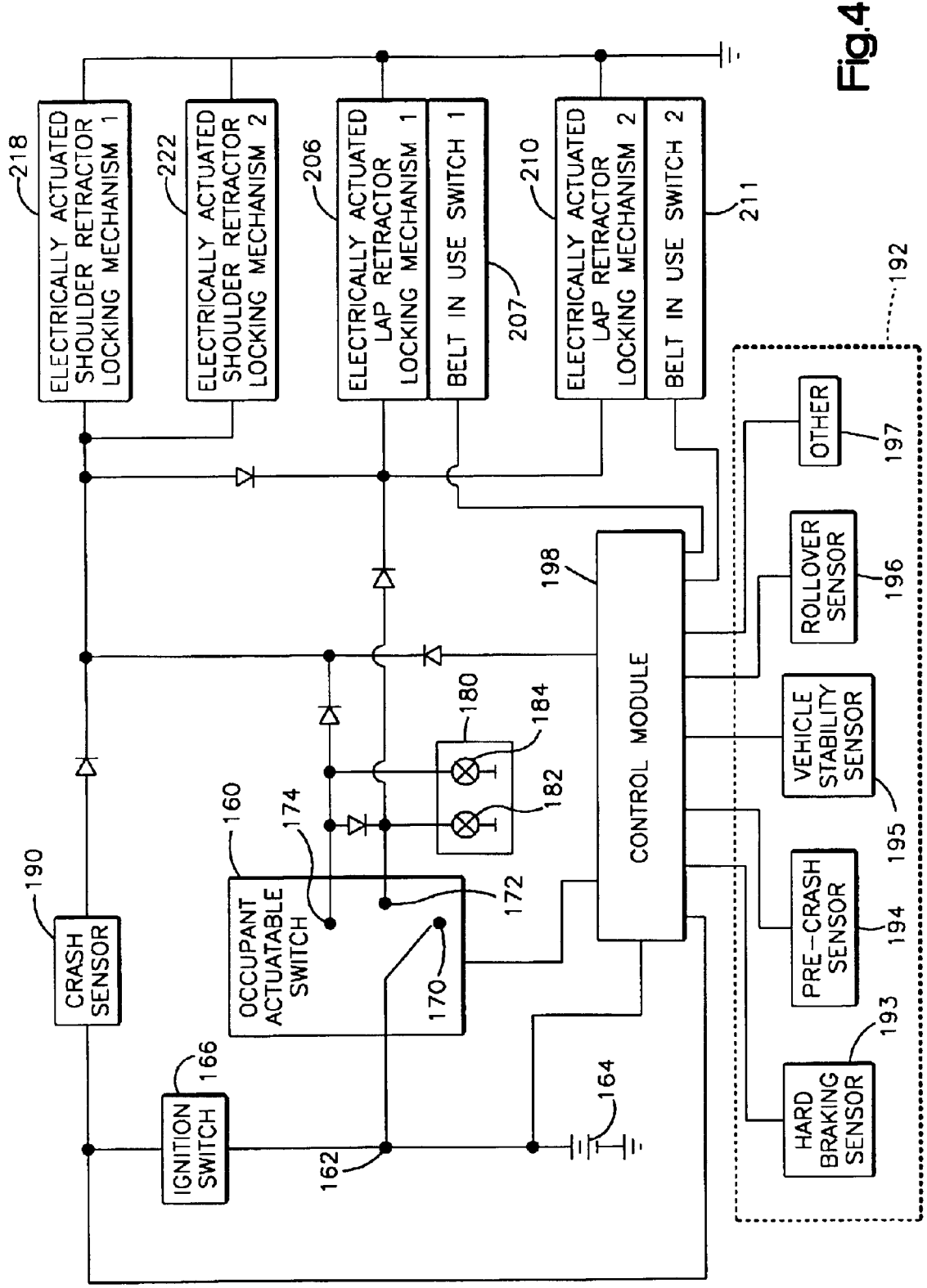
FIG. 4 is a schematic circuit diagram of the vehicle occupant protection system of FIG. 3.

FIGS. 3 and 4 illustrate a vehicle occupant protection system 30' constructed in accordance with a second embodiment of the present invention. Structures in FIGS. 3 and 4 that are similar to or identical to structures of FIGS. 1 and 2 are indicated using the same reference number.

FIG. 3 illustrates two lap belt retractors 200 and 202. Lap belt retractor 200 is associated with lap belt 32. Lap belt retractor 202 is associated with lap belt 34.

Lap belt retractor 200 includes a spool 204. An end of lap belt 32 is secured to the spool 204 and a portion of lap belt 32 is wound around the spool. The lap belt retractor 200 also includes a retraction mechanism (not shown) that is operatively connected to the spool 204 for driving the spool in a retraction direction. For example, the retraction mechanism may include a rewind spring (not shown) that is uncoiled or stretched during rotation of the spool 204 in the withdrawal direction to allow manual withdrawal of the lap belt 32 from the lap belt retractor 200. After manual withdrawal of the lap belt 32, the rewind spring rotates the spool 204 in the retraction direction to remove any slack from the lap belt 32.

The lap belt retractor 200 also includes a known electrically actuatable locking mechanism, shown schematically in FIG. 3 at 206. The locking mechanism 206, in response to receiving an electrical locking signal, is actuated to a locked condition in which the spool 204 of lap belt retractor 200 is prevented from rotating in the withdrawal direction. While the locking mechanism 206 is in the locked condition, the spool 204 may still be rotated in a retraction direction.

The lap belt retractor 200 also includes an in-use switch 207. The in-use switch 207 is a known device that indicates when a predetermined length of lap belt 32 is withdrawn from the lap belt retractor 200. An exemplary in-use switch 62 is disclosed in U.S. Pat. No. 5,931,401, which is assigned to TRW Occupant Restraint Systems GmbH.

Lap belt retractor 202 includes a spool 208. An end of lap belt 34 is secured to the spool 208 and a portion of lap belt 34 is wound around the spool. The lap belt retractor 202 also includes a retraction mechanism (not shown) that is operatively connected to the spool 208 for driving the spool in a retraction direction. For example, the retraction mechanism may include a rewind spring (not shown) that is uncoiled or stretched during rotation of the spool 208 in the withdrawal direction to allow manual withdrawal of the lap belt 34 from the lap belt retractor 202. After manual withdrawal of the lap belt 34, the rewind spring rotates the spool 208 in the retraction direction to remove any slack from the lap belt 34.

The lap belt retractor 202 also includes a known electrically actuatable locking mechanism, shown schematically in FIG. 3 at 210. The locking mechanism 210, in response to receiving an electrical locking signal, is actuated to a locked condition in which the spool 208 of lap belt retractor 202 is prevented from rotating in the withdrawal direction. While the locking mechanism 210 is in the locked condition, the spool 208 may still be rotated in a retraction direction.

The lap belt retractor 202 also includes an in-use switch 211. The in-use switch 211 is a known device that indicates when a predetermined length of lap belt 34 is withdrawn from the lap belt retractor 202. In an exemplary embodiment, the in-use switch 211 may include a magnetized member that is affixed to lap belt 34 at the predetermined length and a sensor for sensing when the magnetized member is withdrawn from the lap belt retractor 202.

FIG. 3 also illustrates two shoulder belt retractors 212 and 214. Shoulder belt retractor 212 is associated with shoulder belt 36. Shoulder belt retractor 214 is associated with shoulder belt 38.

Shoulder belt retractor 212 includes a spool 216. An end of shoulder belt 36 is secured to the spool 216 and a portion of shoulder belt 36 is wound around the spool. The shoulder belt retractor 212 also includes a retraction mechanism (not shown) that is operatively connected to the spool 216 for driving the spool in a retraction direction. For example, the retraction mechanism may include a rewind spring (not shown) that is uncoiled or stretched during rotation of the spool 216 in the withdrawal direction to allow manual withdrawal of the shoulder belt 36 from the shoulder belt retractor 212. After manual withdrawal of the shoulder belt 36, the rewind spring rotates the spool 216 in the retraction direction to remove any slack from the shoulder belt 36.

The shoulder belt retractor 212 also includes a known electrically actuatable locking mechanism, shown schematically in FIG. 3 at 218. The locking mechanism 218, in response to receiving an electrical locking signal, is actuated to a locked condition in which the spool 216 of shoulder belt retractor 212 is prevented from rotating in the withdrawal direction. While the locking mechanism 218 is in the locked condition, the spool 216 may still be rotated in a retraction direction.

Shoulder belt retractor 214 includes a spool 220. An end of shoulder belt 38 is secured to the spool 220 and a portion of shoulder belt 38 is wound around the spool. The shoulder belt retractor 214 also includes a retraction mechanism (not shown) that is operatively connected to the spool 220 for driving the spool in a retraction direction. For example, the retraction mechanism may include a rewind spring (not shown) that is uncoiled or stretched during rotation of the spool 220 in the withdrawal direction to allow manual withdrawal of the shoulder belt 38 from the shoulder belt retractor 214. After manual withdrawal of the shoulder belt 38, the rewind spring rotates the spool 220 in the retraction direction to remove any slack from the shoulder belt 38.

The shoulder belt retractor 214 also includes a known electrically actuatable locking mechanism, shown schematically in FIG. 3 at 222. The locking mechanism 222, in response to receiving an electrical locking signal, is actuated to a locked condition in which the spool 220 of shoulder belt retractor 214 is prevented from rotating in the withdrawal direction. While the locking mechanism 222 is in the locked condition, the spool 220 may still be rotated in a retraction direction.

As shown in FIGS. 3 and 4, switch 160 is operatively connected to both lap belt retractors 200 and 202. When the switch 160 is in the first on position 172, electrical power is transferred to the lap belt retractors 200 and 202. The electric power sent to the lap belt retractors 200 and 202, as a result of switch 160 being in the first on position 172, is the electrical locking signal for lap belt retractors 200 and 202. Thus, in response to the switch 160 being in the first on position 172, the locking mechanisms 206 and 210 of the lap belt retractors 200 and 202, respectively, are actuated into the locked condition and spools 204 and 208 are prevented from rotating in the withdrawal direction. As a result, the lap belts 32 and 34 are locked or cinched in position about the occupant 18.

When the switch 160 is in the second on position 174, electrical power is transferred to the lap belt retractors 200 and 202 and to the shoulder belt retractors 212 and 214. The electric power sent to the lap belt retractors 200 and 202, as a result of switch 160 being in the second on position 174, is the electrical locking signal for lap belt retractors 200 and 202. The electric power sent to the shoulder belt retractors 212 and 214, as a result of switch 160 being in the second on position 174, is the electrical locking signal for shoulder belt retractors. Thus, in response to the switch 160 being in the second on position 174, the locking mechanisms 206 and 210 of the lap belt retractors 200 and 202, respectively, are actuated into the locked condition and spools 204 and 208 of the lap belt retractors are prevented from rotating in the withdrawal direction. As a result, the lap belts 32 and 34 are locked or cinched in position about the occupant 18. Additionally, the locking mechanisms 218 and 222 of the shoulder belt retractors 212 and 214, respectively, are actuated into the locked condition and the spools 216 and 220 of the shoulder belt retractors are prevented from rotating in the withdrawal direction. As a result, the shoulder belts 36 and 38 are locked or cinched in position about the occupant 18.

The vehicle occupant protection system 30' of FIGS. 3 and 4 also includes a crash sensor 190 for detecting a vehicle crash event condition. The crash sensor 190 is operatively connected to lap belt retractors 200 and 202 and to shoulder belt retractors 212 and 214. The crash sensor 190, in response to detecting a crash event condition, outputs electrical locking signals to the lap belt retractors 200 and 202 and the shoulder belt retractors 212 and 214. The locking mechanisms 206 and 210 of the lap belt retractors 200 and 202, respectively, are actuated into the locked condition in response to the electrical locking signal from the crash sensor 190. Similarly, the locking mechanisms 218 and 222 of the shoulder belt retractors 212 and 214, respectively, are actuated into the locked condition in response to the electrical locking signal from the crash sensor 190. The electrical locking signals from the crash sensor 190 are provided in parallel to any electrical locking signals resulting from the positioning of switch 160. Thus, in the event of a crash event condition, both the lap belt retractors 200 and 202 and the shoulder belt retractors 212 and 214 are placed in a locked condition regardless of the position of switch 160.

Advantageously, the crash sensor 190 simultaneously actuates the locking mechanisms 206 and 210 of the lap belt retractors 200 and 202 and the locking mechanisms 218 and 222 of the shoulder belt retractors 212 and 214.

Both lap belt in-use switches 207 and 211 are operatively connected to the control module 198. The control module 198 in determining whether to reset the switch 160 of FIG. 4 considers at least one of the signal from the ignition switch 166 and the signals from the lap belt in-use switches 207 and 211.

Figure 5:
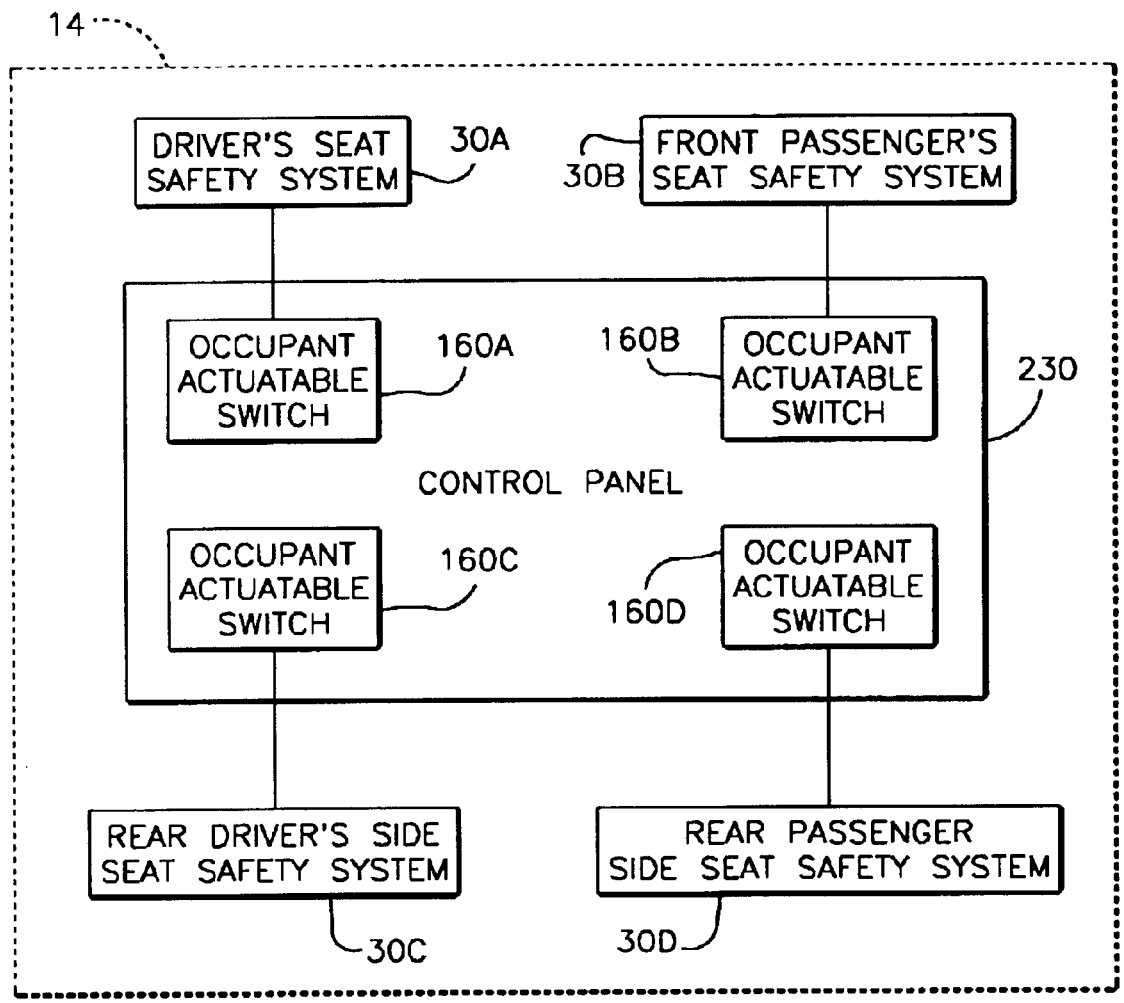
FIG. 5 is a schematic illustration of a vehicle-based control panel having actuatable switches for controlling multiple vehicle occupant protection systems, each of which is constructed in accordance with the present invention.

FIG. 5 is a schematic illustration of a control panel 230 having actuatable switches 160A–160D for controlling multiple vehicle occupant protection systems 30A–30D, each of which is constructed in accordance with the present invention. As shown in FIG. 5, the control panel 230 includes four occupant actuatable switches 160A–160D. A first occupant actuatable switch 160A is operatively connected to a vehicle occupant protection system 30A associated with the driver's seat of the vehicle 14. A second occupant actuatable switch 160B is operatively connected to a vehicle occupant protection system 30B associated with the front passenger's seat of the vehicle 14. A third occupant actuatable switch 160C is operatively connected to a vehicle occupant protection system 30C associated with the rear seat on the driver's side of the vehicle 14. A fourth occupant actuatable switch 160D is operatively connected to a vehicle occupant protection system 30D associated with the rear seat on the passenger's side of the vehicle 14. It should be recognized that the number of occupant actuatable control switches and associated vehicle occupant protection system might be other than four.

The control panel 230 is preferably located on a center console (not shown) located in the vehicle 14 between the driver's seat and the front passenger's seat. The control panel 230 enables the vehicle driver to control the vehicle occupant protection systems 30A–30D for each seat of the vehicle 14.

Figure 6:
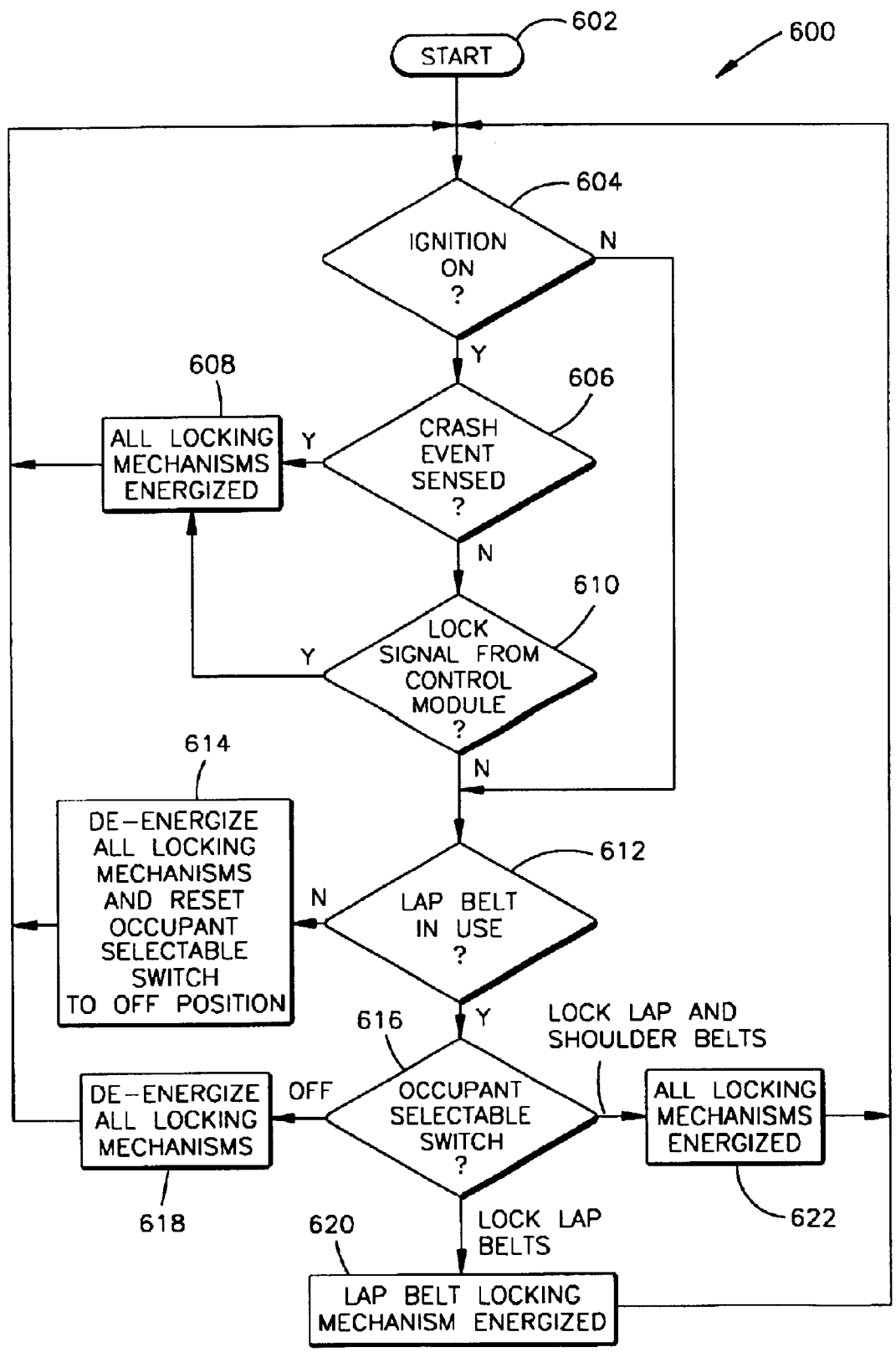
FIG. 6 is a flow diagram illustrating a process of controlling the vehicle occupant protection system of the present invention.

FIG. 6 is a flow diagram illustrating a process 600 of controlling the vehicle occupant protection system 30 and 30' of the present invention. The process 600 begins at step 602 in which memories are cleared and set to initial conditions, flags are reset, etc. At step 604, a determination is made as to whether the ignition switch 166 is in the on or run position. If the determination at step 604 is affirmative, the process 600 proceeds to step 606.

At step 606, a determination is made as to whether the crash sensor 190 has sensed a crash event condition. If the determination at step 606 is affirmative, the process 600 proceeds to step 608 and all locking mechanisms are energized. As a result, all belt retractors are locked against further webbing withdrawal. From step 608, the process 600 returns to step 604. If the determination at step 606 is negative, the process 600 proceeds to step 610.

At step 610, a determination is made as to whether a lock signal or actuation signal is received from the control module 198. If the determination at step 610 is affirmative, the process 600 returns to step 608 and all locking mechanisms are energized. If the determination at step 610 is negative, the process 600 proceeds to step 612. Additionally, if the determination at step 604 is negative and the ignition switch 166 is not in the on position, the process 600 proceeds to step 612.

At step 612, a determination is made as to whether the lap belts 32 and 34 are in use. The lap belt in-use switches 62 or 207, and 211 are monitored to make this determination. If the determination at step 612 is negative, the process 600 proceeds to step 614. At step 614, all locking mechanisms are de-energized or unlocked and the occupant selectable switch 160 is reset to the off position 170. If the determination at step 612 is affirmative, the process 600 proceeds to step 616.

At step 616, the position of the occupant selectable switch 160 is determined. If the switch 160 is in the off position 170, the process 600 proceeds to step 618 and all locking mechanisms are de-energized or unlocked. If the switch 160 is in the first on position 172, the process 600 proceeds to step 620 and the lap belt locking mechanism is energized to lock the lap belts 32 and 34 against further withdrawal. If the switch 160 is in the second on position 174, the process 600 proceeds to step 622 and all locking mechanisms are energized to lock further withdrawal of lap belts 32 and 34 and shoulder belts 36 and 38. From steps 618, 620, and 622, the process 600 returns to step 604.

From the above description of the invention, those skilled in the art will perceive improvements, changes and modifications. For example, a controller may be positioned between the switch 160 and the respective retractors of the vehicle occupant protection system. Such improvements, changes and modifications within the skill of the art are intended to be covered by the appended claims.

Having described the invention, we claim the following:

1. A vehicle occupant protection system comprising:

first and second lap belts, the first lap belt for extending across a first lap portion of the vehicle occupant and the second lap belt for extending across a second lap portion of the vehicle occupant;

at least one lap belt retractor operatively connected to the first and second lap belts and electrically actuatable, in response to receiving a first electrical locking signal, for locking the at least one lap belt retractor to prevent withdrawal of the first and second lap belts;

first and second shoulder belts, the first shoulder belt for extending over a first shoulder of the vehicle occupant and the second shoulder belt for extending over a second shoulder of the vehicle occupant;

a buckle assembly for interconnecting the first and second shoulder belts and the first and second lap belts; and an occupant actuatable mechanism operatively connected to the at least one lap belt retractor and being responsive to actuation by the vehicle occupant for providing the first electrical locking signal to the at least one lap belt retractor.

2. The vehicle occupant protection system as set forth in claim 1 further including:

a crash sensor for detecting a crash event condition and, in response to detecting the crash event condition, for providing the first electrical locking signal to the at least one lap belt retractor.

3. The vehicle occupant protection system as set forth in claim 1 further including:

an indicator operatively connected to the occupant actuatable mechanism and for, in response to receiving the first electrical locking signal, providing an occupant perceptible signal indicating a locked condition of the at least one lap belt retractor.

4. The vehicle occupant protection system as set forth in claim 1 further including:

at least one shoulder belt retractor operatively connected to the first and second shoulder belts and electrically actuatable, in response to receiving a second electrical locking signal, for locking the at least one shoulder belt retractor to prevent withdrawal of the first and second shoulder belts, the occupant actuatable mechanism further being operatively connected to the at least one shoulder belt retractor and being responsive to actuation by the vehicle occupant for providing the second electrical locking signal to the at least one shoulder belt retractor.

5. The vehicle occupant protection system as set forth in claim 4 further including:

a crash sensor for detecting a crash event condition and, in response to detecting the crash event condition, for providing the first electrical locking signal to the at least one lap belt retractor and the second electrical locking signal to the at least one shoulder belt retractor for simultaneously locking the at least one lap belt retractor and the at least one shoulder belt retractor.

6. The vehicle occupant protection system as set forth in claim 4 wherein the occupant actuatable mechanism is a switch having an off position, a first on position, and a second on position, the switch, when in the first on position, providing the first electrical locking signal and, when in the second on position, providing both the first and the second electrical locking signals.

7. The vehicle occupant protection system as set forth in claim 4 further including:

an indicator operatively connected to the occupant actuatable mechanism, the indicator, in response to receiving the first electrical locking signal, providing an occupant perceptible signal indicating a locked condition of the at least one lap belt retractor and, in response to receiving the second electrical locking signal, providing an occupant perceptible signal indicating a locked condition of the at least one shoulder belt retractor.

8. The vehicle occupant protection system as set forth in claim 4 wherein the at least one shoulder belt retractor includes a first shoulder belt retractor that is operatively connected to the first shoulder belt and a second shoulder belt retractor that is operatively connected to the second shoulder belt.

9. The vehicle occupant protection system as set forth in claim 1 wherein the at least one lap belt retractor includes a first lap belt retractor that is operatively connected to the first lap belt and a second lap belt retractor that is operatively connected to the second lap belt.

10. The vehicle occupant protection system as set forth in claim 1 further including other vehicle condition inputs for monitoring associated vehicle conditions and outputting condition signals indicated of the associated vehicle conditions, and a control module operatively connected to the other vehicle condition inputs and the at least one lap belt retractor, the control module being adapted to provide the first electrical locking signal for locking the at least one lap belt retractor in response to at least one of the condition signals.

11. The vehicle occupant protection system as set forth in claim 10 further including:

at least one shoulder belt retractor operatively connected to the first and second shoulder belts and electrically actuatable, in response to receiving a second electrical locking signal, for locking the at least one shoulder belt retractor to prevent withdrawal of the first and second shoulder belts, the control module further being operatively connected to the at least one shoulder belt retractor and adapted to provide the second electrical locking signal to the at least one shoulder belt retractor in response to at least one of the condition signals.

12. A vehicle occupant protection system comprising:

first and second lap belts, the first lap belt for extending across a first lap portion of the vehicle occupant and the second lap belt for extending across a second lap portion of the vehicle occupant;

at least one lap belt retractor operatively connected to the first and second lap belts and electrically actuatable, in response to receiving a first electrical locking signal, for locking the at least one lap belt retractor to prevent withdrawal of the first and second lap belts;

first and second shoulder belts, the first shoulder belt for extending over a first shoulder of the vehicle occupant and the second shoulder belt for extending over a second shoulder of the vehicle occupant;

a buckle assembly for interconnecting the first and second shoulder belts and the first and second lap belts;

an occupant actuatable switch having an off position and a first on position, the occupant actuatable switch, when in the first on position, providing the first electrical locking signal to the at least one lap belt retractor; and a crash sensor for detecting a crash event condition and for providing the first electrical locking signal to the at least one lap belt retractor when the occupant actuatable switch is in the off position and a crash event condition is detected.

13. The vehicle occupant protection system as set forth in claim 12 further including:

an indicator operatively connected to the occupant actuatable switch for indicating when the switch is in the first on position.

14. The vehicle occupant protection system as set forth in claim 12 further including:

at least one shoulder belt retractor operatively connected to the first and second shoulder belts and electrically actuatable, in response to receiving a second electrical locking signal, for locking the at least one shoulder belt retractor to prevent withdrawal of the first and second shoulder belts, the occupant actuatable switch further having a second on position, the switch, when in the second on position, providing the first electrical locking signal to the at least one lap belt retractor and providing the second electrical locking signal to the at least one shoulder belt retractor.

15. The vehicle occupant protection system as set forth in claim 14 wherein the crash sensor provides the first electrical locking signal to the at least one lap belt retractor and the second electrical locking signal to the at least one shoulder belt when the occupant actuatable switch is in the off position and a crash event condition is detected and wherein the crash sensor provides the second electrical locking signal to the at least one shoulder belt when the occupant actuatable switch is in the first on position and a crash event condition is detected.

16. The vehicle occupant protection system as set forth in claim 14 further including:

an indicator operatively connected to the occupant actuatable switch for providing a first occupant perceptible signal when the switch is in the first on position and for providing a second occupant perceptible signal when the switch is in the second on position.

17. The vehicle occupant protection system as set forth in claim 14 wherein the at least one shoulder belt retractor includes a first shoulder belt retractor that is operatively connected to the first shoulder belt and a second shoulder belt retractor that is operatively connected to the second shoulder belt.

18. The vehicle occupant protection system as set forth in claim 12 wherein the at least one lap belt retractor includes a first lap belt retractor that is operatively connected to the first lap belt and a second lap belt retractor that is operatively connected to the second lap belt.

19. The vehicle occupant protection system as set forth in claim 12 further including other vehicle condition inputs for monitoring associated vehicle conditions and providing condition signals indicated of the associated vehicle conditions, and a control module operatively connected to the other vehicle condition inputs and the at least one lap belt retractor, the control module being adapted to provide the first electrical locking signal for locking the at least one lap belt retractor in response to at least one of the condition signals.

20. The vehicle occupant protection system as set forth in claim 19 further including:

at least one shoulder belt retractor operatively connected to the first and second shoulder belts and electrically actuatable, in response to receiving a second electrical locking signal, for locking the at least one shoulder belt retractor to prevent withdrawal of the first and second shoulder belts, the control module further being operatively connected to the at least one shoulder belt retractor and adapted to provide the second electrical locking signal to the at least one shoulder belt retractor in response to at least one of the condition signals.

* * * * *